United States Patent [19]

Williams

[11] 4,013,268
[45] Mar. 22, 1977

[54] VARIABLE PITCH VEHICLE WHEEL SUPPORT RAMP

[76] Inventor: Hugh M. Williams, 34 N.E. 37, Oklahoma City, Okla. 73105

[22] Filed: Mar. 8, 1976

[21] Appl. No.: 665,020

[52] U.S. Cl. .............................................. 254/88
[51] Int. Cl.² ......................................... E02C 3/00
[58] Field of Search ..................... 254/88; 248/352

[56] References Cited

UNITED STATES PATENTS 2,237,620  4/1941  Doughty et al. ..................... 254/88

Primary Examiner—Al Lawrence Smith
Assistant Examiner—Robert C. Watson
Attorney, Agent, or Firm—Robert K. Rhea

[57] ABSTRACT

A vertically adjustable inclined ramp for supporting a wheel on an inclined surface includes a base member and a two-piece hingedly connected ramp member overlying the base. A plurality of wedge members are selectively juxtaposed between one end of the base and one end of the ramp member for disposing the ramp member on an inclined plane.

1 Claim, 4 Drawing Figures

VARIABLE PITCH VEHICLE WHEEL SUPPORT RAMP

BACKGROUND OF THE INVENTION

1. Field of the Invention

The present invention relates to vehicle wheel raising devices and more particularly to a vertically adjustable inclined ramp onto which a wheel may be driven for horizontally supporting a vehicle on an incline of the earth's surface.

When occupying permanently parked mobile homes or recreational vehicles it is desirable that the mobile home or vehicle be leveled. Such leveling is necessary for proper operation of some appliances, such as refrigerators, however, the act of leveling the frame of such vehicles, when parked on an incline of the earth's surface, is not easily accomplished and is at best a time consuming operation involving the use of jacks or supporting blocks.

This invention provides a vertically adjustable ramp, one for each wheel necesssary to be elevated to level a vehicle.

2. Description of the Prior Art

Prior patents generally disclose inclined ramps for elevating one end of the vehicle above the surface of the earth for access to the undercarriage of the vehicle in which these ramps are generally of the fixed position type, some of which may be collapsed for storage but generally do not provide means for varying the incline of the wheel supporting portion of the ramp.

Other patents disclose inclined ramp members generally for the purpose of lifting vehicle wheels wherein the ramp may be collapsed after a jack or block is placed under the vehicle axle or understructure for the purpose of releasing the ramp member from a wheel supporting position and changing a vehicle tire. These patents similarly do not provide a means for varying the incline of the Wheel supporting portion thereof.

This invention provides a simply constructed, easily operated vehicle wheel support featuring a two-piece hingedly connected ramp which may be vertically adjusted between a horizontal position and a maximum angle of elevation to vary the incline and support a vehicle wheel thereon.

SUMMARY OF THE INVENTION

An elongated, channel-like in transverse section, base member is provided with upstanding stop forming end walls coextensive with the upstanding legs of the channel-shape. A two-piece channel-like ramp member, having an overall length slightly less than the overall length of the base when the two-pieces are juxtaposed in longitudinally aligned relation, is hingedly connected together at their juxtaposed edges permitting the ramp members to pivot vertically about the horizontal axis forming their hinged connection. A plurality of wedges composed of rectangular block members, supported by the base, are selectively disposed in juxtaposed relation to wedge the ramp members against the stops and vary the incline of the ramp members.

The principal objects of this invention are to provide a simply constructed manually vertically adjustable ramp for supporting a vehicle wheel and leveling the vehicle which, when collapsed for storage, occupies a minimum of space.

DESCRIPTION OF THE PREFERRED EMBODIMENT

Figure 1:
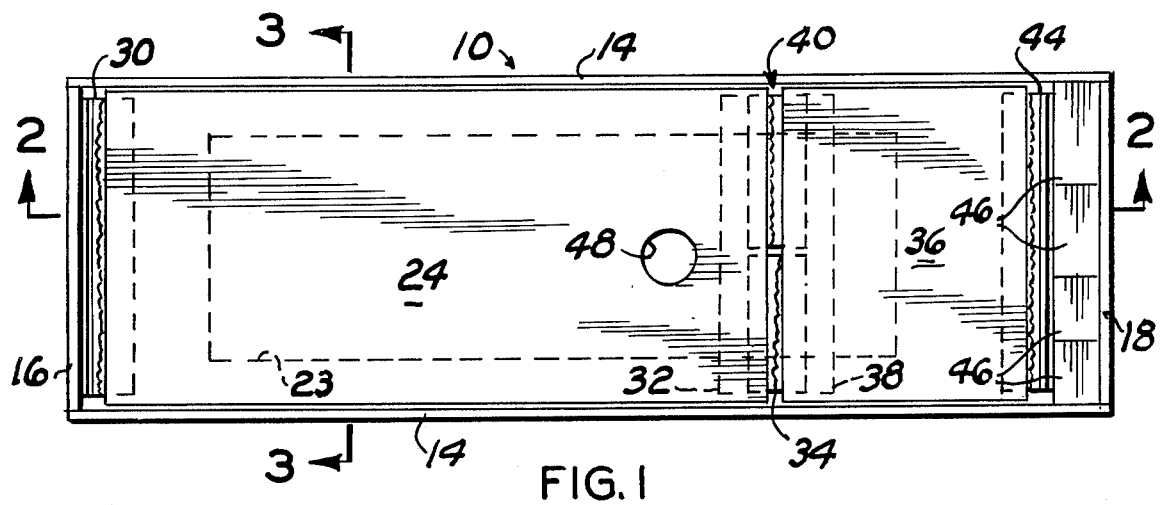
FIG. 1 is a top view of the ramp in a collapsed horizontal position.

Like characters of reference designate like parts in those figures of the drawings in which they occur.

In the drawings:

The reference numeral 10 indicates the device, as a whole, which is rectangular flat panel-like in general, configuration when in a collapsed or stored position. The device 10 comprises base means 12 which is channel-like in transverse section having its legs 14 disposed upwardly. The respective end of the base is provided with stop means formed by upstanding wall-like end members 16 and 18 coextensive with the height of the legs 14. The bight portion 20 of the base is provided with a central aperture of lightening hole 23 to reduce the overall mass.

An elongated wheel support ramp 24, having a length less than the overall length of the base 12 by a selected dimension, transversely and longitudinally overlies the greater portion of the base. The ramp 24 is similarly channel-like in transverse section having its bight portion 22 disposed upwardly and its depending legs 28 disposed adjacent the inner limit of the respective base legs 14. The end portion of the ramp 24, adjacent the base end wall 16, is rigidly connected, as by welding, with first bearing means comprising a shaft or tube 30 extending transversely between the ramp legs 28. The depending surface of the other end portion of the ramp 24 is similarly secured to a transverse angle iron brace 32. One-half the transverse width of the ramp end surface, adjacent the angle brace 32 and a cooperating one-half of the length of this angle brace 32, is welded to a pipe 34 extending transversely of the ramp 24 between its legs 28. A similarly channel-shaped second or ramp brace 36 has one end disposed adjacent the pipe connected end of the ramp 24 and projects, at its other end, toward the base end wall 18. The depending surface of the ramp brace 36, adjacent the ramp 24, is similarly provided with a depending angle iron 38 and one-half the transverse width of the adjacent end surface of the ramp brace 36 and one-half the length of the angle iron brace 38 is similarly connected to the other end portion of the pipe 34. Prior to joining the ramp 24 and ramp brace 36 to the pipe 34, the pipe 34 is transversely cut medially its ends thus, in combination with the ramp 24 and ramp brace 36, forming a hinged joint 40 for vertical pivoting movement of the hingedly connected end portions of the ramp 24 and ramp brace 36 about a horizontal axis toward and away from the plane of the base bight portion 20. The pipe 34 is preferably provided with a filler, such as a shaft, which forms a hinge pin 42.

The other end portion of the ramp brace 36 is similarly connected to second bearing means comprising a third pipe 44 or shaft extending transversely between the ramp brace legs 28 in parallel spaced relation with respect to the base end wall 18.

The spacing between the pipe 44 and base end wall 18 receives a plurality, four in the example shown, of longitudinally aligned, when in stored position, rectangular block members 46 preferably square in transverse section which may be tubes. The block members 46 are to be disposed in juxtaposed relation between the pipe 44 and base end wall 18 to maintain the ramp 24 on a selected incline.

Operation

Figure 2:
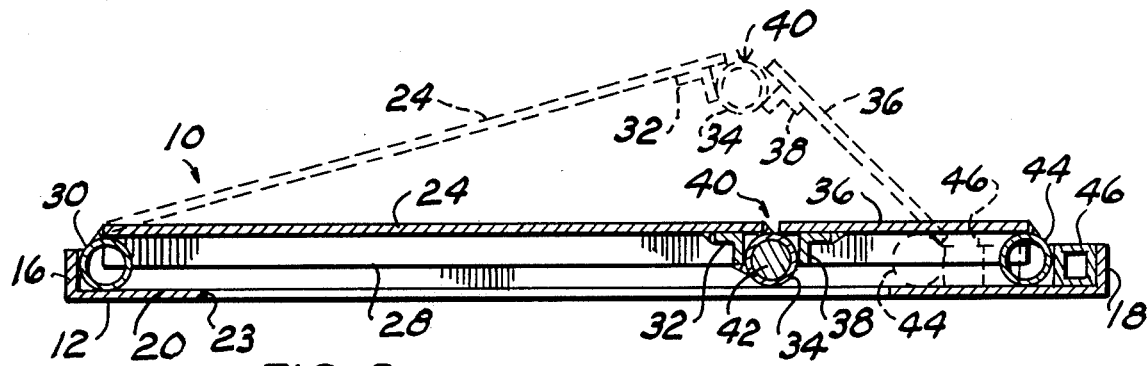
FIG. 2 is a vertical cross sectional view taken substantially along the line 2—2 of FIG. 1 and illustrating, by dotted lines, a vertically adjusted position of the ramp member.
Figure 3:
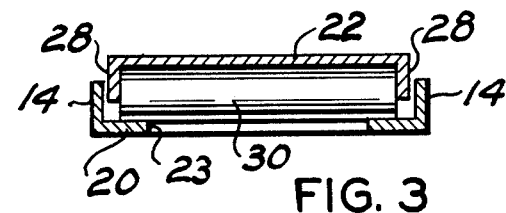
FIG. 3 is a vertical cross sectional view taken substantially along the line 3—3 of FIG. 1; and, FIG. 4 is a side elevational view, of the ramp in operative position When supporting a vehicle wheel on an incline of the earth's surface, a fragment of the wheel being shown by solid lines.
Figure 4:
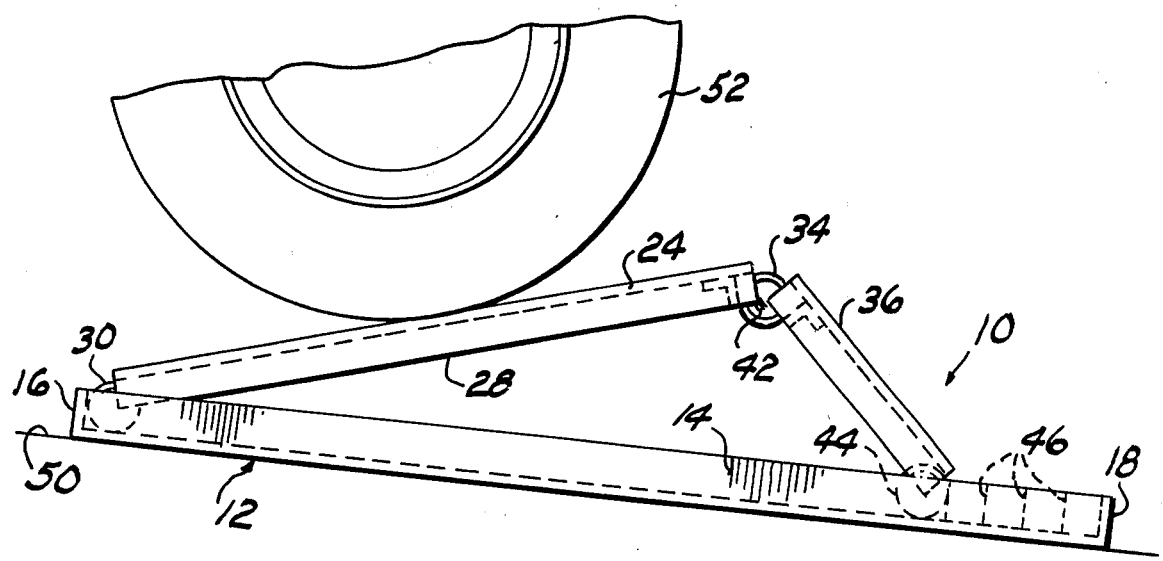

In operation, the device 10 is normally in a collapsed stored position, as shown by solid lines (FIGS. 1 and 2). After a vehicle is spotted in a desired location the device is longitudinally disposed in the direction of vehicle travel on the earth's surface, indicated by the line 50 (FIG. 4) in front of or behind a low wheel or wheels desired to be lifted with the end wall 16 of the base adjacent the tire or tires. The ramp 24 is manually lifted, as by means of a finger hole 48, formed therein (FIG. 1) and a selected number of the blocking members 46 are disposed in juxtaposed relation between the pipe 44 and base end wall 18 thus wedging the ramp brace connected pipe 44 in selected spaced relation with respect to the end wall 18 and maintaining the ramp 24 on a selected incline. The vehicle is then moved toward the ramp 24 until its wheel 52, when disposed on the inclined surface of the ramp 24, levels the vehicle.

Obviously the invention is susceptible to changes or alterations without defeating its practicability. Therefore, I do not wish to be confined to the preferred embodiment shown in the drawings and described herein.

I claim:
1. A vehicle wheel supporting device, comprising:
an elongated channel-shaped base having upstanding legs and a bight portion adapted to flatly contact the surface of the earth and having an upstanding stop forming wall at its respective ends;
hingedly connected ramp means transversely and longitudinally overlying an intermediate portion of said base between said legs and said stop walls,
said ramp means comprising a channel-shaped elongated ramp having an upwardly disposed bight portion forming a planar wheel supporting surface, and
a channel-shaped ramp brace of less length than said ramp,
the hingedly connected end portions of said ramp means being vertically movable toward and away from said base about the axis of the hinge connection;
bearing means comprising a generally cylindrical member having a radius of less dimension than the height of the respective said stop wall extending transversely of and connected in depending supporting relation with the end portion of said ramp and said ramp brace opposite the hinged connection and slidable on said base bight portion; and,
a plurality of elongated wedges each having opposing parallel side surfaces interposed in side by side relation between one said bearing means and one said stop wall for maintaining said ramp and said ramp brace on an incline with respect to said base.

* * * * *